Nov. 15, 1960  C. KELLER  2,960,086
APPARATUS FOR MEASURING THE ARTERIAL BLOOD PRESSURE
Filed July 9, 1958  2 Sheets-Sheet 1

Inventor:
Carl Keller
By
Watson Cole, Grindle + Watson
Attys.

Nov. 15, 1960  C. KELLER  2,960,086
APPARATUS FOR MEASURING THE ARTERIAL BLOOD PRESSURE
Filed July 9, 1958  2 Sheets-Sheet 2
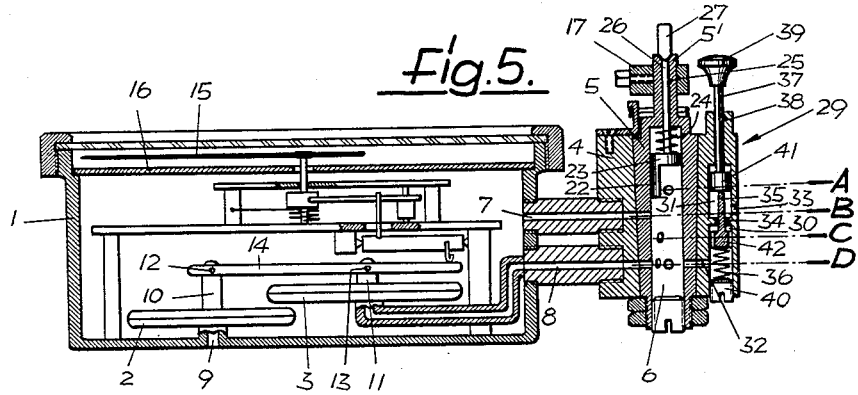
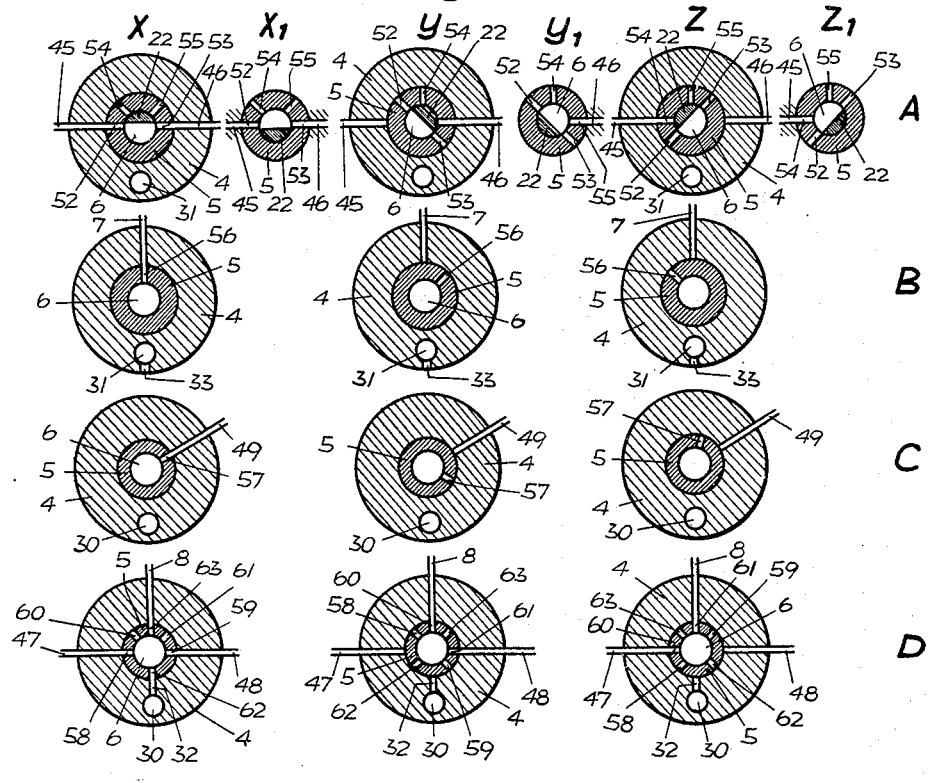
Inventor:
Carl Keller
By
Watson Cole Grindle + Watson
Attys.

# United States Patent Office 2,960,086
Patented Nov. 15, 1960

2,960,086

APPARATUS FOR MEASURING THE ARTERIAL BLOOD PRESSURE

Carl Keller, Jungingen, Wurttemberg, Germany, assignor to Bosch & Speidel, Jungingen, Germany, a firm of Germany Filed July 9, 1958, Ser. No. 747,455

Claims priority, application Germany July 15, 1957

5 Claims. (Cl. 128—2.05)

The present invention relates to an apparatus for measuring the arterial blood pressure. More particularly, the invention relates to such an apparatus which consists of two pressure cells which are connected to the same indicating instrument and are provided within an inflatable pressure chamber, and in which the inside of one cell communicates with the outer atmosphere, while the inside of the other cell communicates with one section of a hollow, subdivided elastic sleeve or the like which is to be placed around a limb of the human body, and wherein, on the one hand, by means of a control element, the pressure chamber and the section of the hollow sleeve which is connected thereto, and, on the other hand, the other section of the hollow sleeve and the pressure cell which is connected thereto may be connected to each other or separated from each other, or connected to the outer atmosphere, and the pressure chamber and the section of the hollow sleeve which is connected thereto may be separated from each other.

In an apparatus of this type which was known prior to the invention, the pressure chamber and the two sections of the hollow sleeve may be inflated by means of a pump up to a pressure which is higher than the systolic blood pressure of the patient. Thereafter, the pressure is again intermittently reduced by repeatedly releasing a certain amount of air. The pointer of the indicating instrument is then supposed to show the pressure which prevails at any particular time within the system. However the pointer never remains perfectly still but always fluctuates slightly due to the fact that the pulse wave will, at every stroke of the pulse, slightly enlarge the portion of the limb, for example, the arm, which is enclosed by the hollow sleeve. The size of these fluctuations of the pointer changes in accordance with the amount of pressure in the system. While at first, at a high pressure, these fluctuations are very small, they will increase in size as the pressure decreases, then they remain large for a certain length of time, and finally they again decrease in size. During the period when passing over from the upper, small fluctuations to the large fluctuations, the pressure in the system will correspond to the systolic blood pressure, while during the period when passing over from the large fluctuations to the lower small fluctuations, the pressure in the system will correspond to the diastolic blood pressure. The evaluation of the relative sizes of the pulse fluctuations is made difficult by the fact that the fluctuations, considered absolutely, are always relatively small even within the zone of the large fluctuations. They could be increased to many times their size, on the one hand, by a suitable leverage system within the apparatus and, on the other hand, by interrupting the connection between the pressure chamber and the upper section of the hollow sleeve, and by also closing these two hollow spaces relative to the connection between the lower section of the hollow sleeve and the respective pressure cell. In this manner, only the fluctuations occurring in the lower section of the hollow sleeve but not those in the upper section will be indicated. Under the high pressure in the system, the pulse wave is not capable of penetrating through the upper section of the hollow sleeve and into the lower section. However, at that moment in which the pressure within the system sinks below the systolic blood pressure, it will penetrate, and will thus suddenly indicate large fluctuations in the lower section of the hollow sleeve.

It is an object of the present invention to provide an apparatus which, by means of two double sleeves, permits comparative measurements to be carried out on corresponding human limbs either at the same time or subsequently to each other, and to design such apparatus accordingly, and especially in a manner so as to permit it to be operated very easily.

In order to attain this object, the present invention provides two subdivided elastic hollow sleeves which are connected to the control element in such a manner as to permit all the sections of the hollow sleeves, the pressure chamber, and one of the pressure cells to be connected at the same time with the pump, or, alternately, the two sections of one or the other hollow sleeve to be connected with such pressure cell, or, alternately, the lower section of one of the hollow sleeves or of the other sleeve to be connected with the same pressure cell.

The control element is made in the shape of a valve and designed so that radial bores are provided at different planes within the wall of the valve housing and in the wall of the hollow valve plug, so that, within the first plane, the two upper sections of the hollow sleeve will be connected to the chamber within the valve plug; within a second plane, the pressure chamber will be connected to the chamber within the plug; in a third plane, the pump will be connected to the chamber within the plug; within a fourth plane, the lower sections of the hollow sleeves will be connected either individually or together to one pressure cell and to the chamber within the plug, while the latter may be connected to the outer atmosphere by means of another or secondary valve which must be separately operated, and the upper sections of the hollow sleeves may be alternately shut off from the plug chamber by means of an inner plug which is mounted in the plug chamber within the area of the first plane.

In order to facilitate the operation, the valve plug is provided at a point outside of the valve housing with a swivel-shaped handle which is secured to the shaft of the plug. This swivel is normally maintained in a central position by a torsion spring and stop pins engaging the ends of this spring. The arms of the swivel are provided with stops which in the end positions are adapted to engage with other stops on the upper side of the valve housing.

The inner valve plug is made in the shape of a segment of a cylinder which is mounted on a disk, and this disk is acted upon in the axial direction by a compression spring which is interposed between the disk and one end of the plug chamber. The inner valve plug is further provided with a shaft which is rotatable within the axial bore in the main plug shaft and carries on its outer end a handle which, under the action of the mentioned compression spring, is capable of engaging in notches which are provided in the upper end of the main plug shaft and permit the inner valve plug to be adjusted to two diametrically opposite positions by a 180° turn of the inner-plug handle relative to the main plug.

In order to facilitate the operation of the valve mechanism and to improve the sealing action thereof toward the outer atmosphere, the secondary valve which connects the plug chamber with the atmosphere is provided with two coaxial cylindrical chambers, one of which may be connected with the plug chamber, while the other chamber communicates with the outer atmosphere. The valve member consists of a slender valve cone which extends from one chamber to the other chamber through an opening in the wall separating the two chambers which thus forms the valve seat, and this valve member is acted upon by a spring in the chamber which is connected to the plug chamber to maintain this valve normally in the closed position. The end of the valve cone which extends into the other chamber of this valve may be acted upon by a rod or the like which extends to the outside of the valve and carries a knob for the operation thereof.

Further objects, features, and advantages of the present invention will be apparent from the following detailed description thereof, particularly when read with reference to the accompanying drawings, in which—

Figure 5 shows a cross section taken along line V—V of Figure 2; while

Figure 6 shows a diagrammatic illustration of the various positions of adjustment of the control valve.

Figure 1:
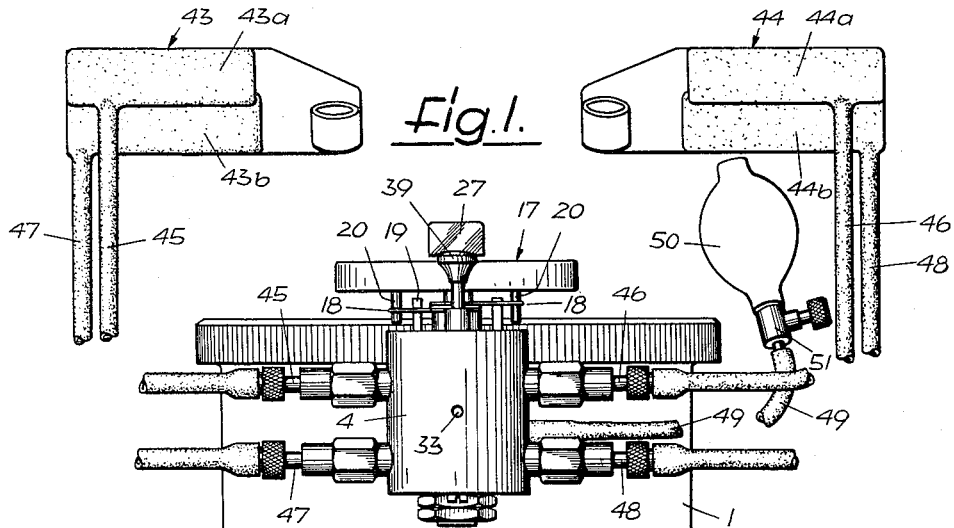
Figure 1 shows an elevation of the apparatus including the indicating instrument, the valve mechanism, the pump, and the two hollow sleeves, as seen from the inside thereof.
Figure 2:
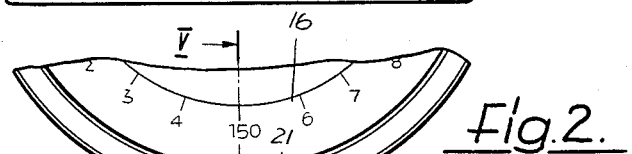
Figure 2 shows a plan view of a part of the apparatus with the valve set in its central position.
Figures 3, 4:
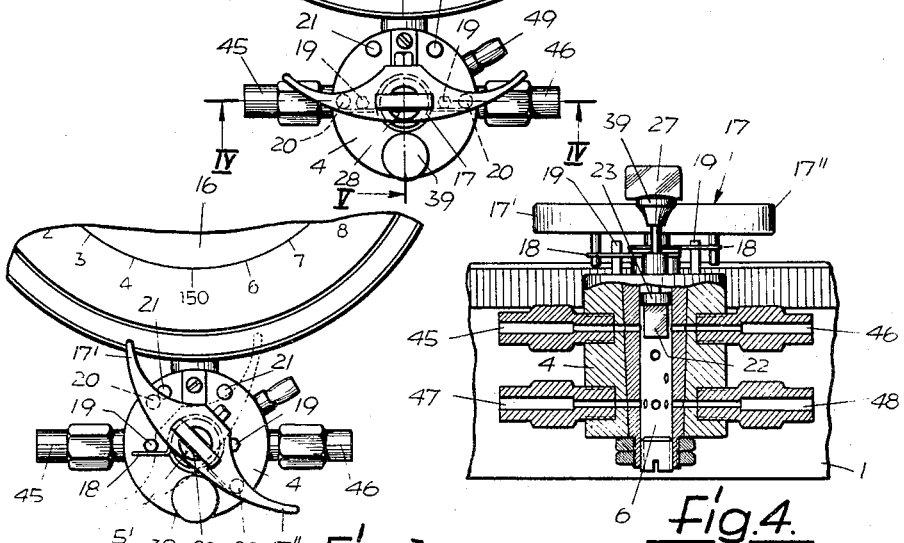
Figure 3 shows a similar plan view with the valve set in one of its end positions.
Figure 4 shows a cross section taken along line IV—IV of Figure 2.

Referring to the drawings, the apparatus according to the invention consists of a pressure chamber 1 in which two pressure cells 2 and 3 are mounted, as shown particularly in Figure 5. Adjacent to pressure chamber 1, a valve housing 4 is mounted which has a valve plug 5 therein which contains a chamber 6. This chamber may be connected, on the one hand, by a conduit 7 to pressure chamber 1 and, on the other hand, by a conduit 8 to the inside of pressure cell 3. Conduits 7 and 8 are made of sufficient strength to support valve housing 4. The inside of pressure cell 2 always communicates with the outer atmosphere through a conduit 9.

Pressure cells 2 and 3 are connected by a rod 10 or 11 and pivot pins 12 or 13, respectively, to a common lever 14. Pivot pin 12 is located near the end of lever 14, while pivot pin 13 is located substantially at the center of the lever. The free end of lever 14 is connected in a manner known as such through suitable transmitting means to a pointer 15 which sweeps over a scale 16 of an indicating instrument.

Outside of valve housing 4, valve plug 5 is provided with a swivel 17 which is normally held in a central position by means of a torsion spring 18, the ends of which engage with stop pins 19. Swivel 17 further carries on each arm 17' and 17" a stop pin 20 which is adapted to engage with a stop pin 21 on the upper side of housing 4 to limit the movement of swivel 17 in each direction. The upper part of chamber 6 in plug 5 contains an inner plug 22 which, as shown particularly in Figure 5, is made in the form of a segment of a cylinder 22 which extends downwardly from a disk 23. This disk 23, which is acted upon in the axial direction by a compression spring 24 which is interposed between disk 23 and the upper end of plug chamber 6, is connected to a shaft 26 which is rotatably mounted in an axial bore 25 in plug shaft 5' and carries on its outer end a handle 27 which is adapted to engage in a pair of diametrically opposite notches 28 in the end surface of shaft 5' so that handle 27 may be fixed in two positions which are disposed at an angle of 180° to each other.

Valve housing 4 and valve plug 5 in chamber 6 are both provided within different horizontal planes A, B, C, and D with passages or conduits which are diagrammatically indicated in Figure 6.

Valve housing 4 further contains adjacent and parallel to valve plug 5 a second valve 29 which has two coaxial chambers 30 and 31, one of which is adapted to be connected through a conduit 32 to plug chamber 6, while the other communicates with the outer atmosphere through an opening 33. A conical bore in the wall 34 separating chambers 30 and 31 contains a slender valve cone 35 which is acted upon by a coil spring 36 in chamber 30 to maintain valve 29 normally in the closed position. The upper end of valve cone 35 which extends into chamber 31 may be moved in the axial direction by a rod 37 which is longitudinally slidable within a bore 38 in valve housing 4 and provided at its outside end with a knob 39. The lower end of chamber 30 is closed by a screw plug 40. Rod 37 is guided within chamber 31 by means of a piston 41, while valve cone 35 is guided within chamber 30 by means of a piston 42 which is provided with longitudinal passages therein. This type of a design of valve 29 affords a very effective sealing action and is easy to manipulate.

The various operating positions of the valve control mechanism according to the present invention may be attained by the following construction of the valve housing 4 and valve plug 5, as illustrated diagrammatically in Figure 6:

Valve housing 4 and the outer wall of plug 5 are provided with passages which are disposed within different horizontal planes, whereby the following connections or operating positions A, B, C, and D may be attained when plug 5 is turned by swivel 17, as illustrated in the four horizontal rows in Figure 6. In the vertical rows, X indicates the position of valve plug 5 when swivel 17 is in its central position, Y indicates the position of valve plug 5 when swivel 17 is in one end position, while Z indicates the position of valve plug 5 in the other end position of swivel 17. The positions $X_1$, $Y_1$, and $Z_1$ indicate the positions of the inner plug 22 which may be alternately set up in the respective positions X, Y, and Z.

Within the level A of valve housing 4, the same is connected by conduits 45 and 46, which consist at least partly of rubber tubes, to the upper sections 43a and 44a of hollow sleeves 43 and 44, respectively, as illustrated in Figure 1, which are applied to the limbs of the human body, while within the level D of valve housing 4, similar conduits 47 and 48 are connected to the lower sections 43b and 44b of sleeves 43 and 44, respectively, which are located more remotely from the heart than sections 43a and 44a.

Within the level C of valve housing 4, the same is provided with another radial bore which is connected by a rubber conduit 49 to a hand pump or rubber ball 50 which is provided in the usual manner with an intake check valve 51.

Within the level A, valve plug 5 has two coaxial radial bores 52 and 53 which, when the valve is set to the position X, interconnect conduits 45 and 46 leading to the upper sections 43a and 44a of sleeves 43 and 44, respectively. Valve plug 5 further has two radial bores 54 and 55 which are disposed at such an angle that, depending upon the position of the inner plug 22, when swivel 17 is turned to its one end position Y or Y', the radial bore 55 will either connect the plug chamber 6 with conduit 46 and thus with the upper section 44a of sleeve 44 or disconnect them from each other while, when swivel 17 is in its other end position Z or $Z_1$, the radial bore 54 will either connect conduit 45 and the upper section 43a of sleeve 43 with plug chamber 6 or disconnect them from each other, depending upon the position of the inner plug 22. When the valve is in the position Y, plug chamber 6 may be connected to conduit 46, but this may be done only when the inner plug 22 has been set to the position $Y_1$. Similarly it is possible in the position Z to connect plug chamber 6 with conduit 45, but only when the inner plug 22 has been set to the position $Z_1$.

Within the level B, valve plug 5 has a radial bore 56 which in the position X, that is, in the central position of swivel 17, connects plug chamber 6 with conduit 7 and thus with pressure chamber 1.

Within the level C valve plug 5 has a radial bore 57 which in the central position X connects plug chamber 6 with conduit 49 and thus with pump 50.

Within the level D, valve plug 5 has bores 58, 59, 60, and 61 corresponding to bores 52, 53, 54, and 55 within the level A. By means of these bores it is possible to connect both conduits 47 and 48, and thus the lower sections 43b and 44b of sleeves 43 and 44, with plug chamber 6 when swivel 17 is in the central position X, while when swivel 17 is in position Y or Z, only one or the other conduit 47 or 48 will be connected to plug chamber 6. Valve plug 5 further has a radial bore 62 extending at a right angle to bores 58 and 59. When swivel 17 is in the central position X, this bore 62 connects plug chamber 6 through bore 32 in valve housing 4 with valve chamber 30. Diametrically opposite to bore 62, valve plug 5 further has a radial bore 63 which, in the central position X, connects plug chamber 6 through conduit 8 with the inside of pressure cell 3. Finally, when swivel 17 is in the position Y or Z, bores 60 and 61 connect plug chamber 6 through conduit 8 with the inside of pressure cell 3.

Thus, when the valve is set to the position X, the lower sleeve sections 43b and 44b, the plug chamber 6, pressure chamber 1, pump 50, the inside of pressure cell 3, the upper sections 43a and 44a, and valve 29 will be connected with each other. Consequently, this position X is the pumping position in which the same pressure will be maintained at all points so that no damage can occur when the pressure is pumped up. The movement of the inner plug 22 from the position X to the position $X_1$ is in this respect of no consequence.

When the valve is set to the position Y, the lower section 44b of sleeve 44 will be connected with plug chamber 6 and with the inside of pressure cell 3. If the inner plug 22 is turned 180° to the position $Y_1$, the upper sleeve section 44a may also be connected thereto.

When the valve is set to the position Z, the lower section 43b of sleeve 43 will be connected with plug chamber 6 and with the inside of pressure cell 3. If the inner plug 22 is turned from this position Z to the position $Z_1$, the upper section 43a of sleeve 43 may also be connected thereto.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. An apparatus for measuring the arterial blood pressure comprising a pressure chamber, means for increasing the pressure within said pressure chamber, a pair of pressure cells mounted within said pressure chamber, an indicating instrument, means for connecting both pressure cells to said indicating instrument, the inside of one of said pressure cells communicating with the outer atmosphere, a pair of hollow sleeves each adapted to be applied around the limbs of a human body, each of said sleeves being divided into an upper section and a lower section, and control means for connecting both sections of both sleeves, said pressure chamber, and the inside of the second pressure cell to said pressure increasing means when said control means are set in one position, and for connecting simultaneously both sections of one of said sleeves or simultaneously both sections of the other sleeve to the inside of said second pressure cell when said control means are set in a second or third position respectively, and for connecting only the lower section of said one sleeve or only said lower section of the other sleeve with said second pressure cell when said control means are set in a fourth or fifth position respectively, said control means also including means for releasing the pressure from said pressure chamber, said sleeves, and said second pressure cell.

2. An apparatus as defined in claim 1, wherein said control means comprise a valve, said valve comprising a valve housing, a valve plug rotatably mounted within said housing and having a chamber therein extending in the axial direction thereof, and a plurality of radial bores within the walls of said housing and of said valve plug extending in different parallel planes so that, within a first plane, the two upper sections of said hollow sleeves may be connected with said plug chamber; within a second plane, said pressure chamber may be connected with said plug chamber; within a third plane, said pressure increasing means may be connected with said plug chamber; within a fourth plane, the lower section of at least one of said sleeves may be connected with one of said pressure cells and with said plug chamber, a second valve adapted to be operated separately from said first valve for connecting said plug chamber with the outer atmosphere, and an inner plug rotatably mounted within the said plug chamber and within the area of said first plane, said inner plug being shaped so that it shuts off the upper section of one of said sleeves from said plug chamber when turned to one position, and that it shuts off the upper section of the other sleeve from said plug chamber when turned to another position.

3. An apparatus as defined in claim 2, further comprising a handle at the outside of said valve housing and secured to said valve plug for operating the same, a torsion spring for normally maintaining said handle and valve plug in a central position, and stop means on said handle and on the outside of said valve housing operatively associated with each other to limit the rotary movement of said handle and said valve plug in both directions.

4. An apparatus as defined in claim 2, wherein said inner plug comprises a disk and an adequately dimensioned segment of a cylinder secured to said disk, a compression spring interposed between said disk and one end of said plug chamber, a shaft secured to said disk and rotatably mounted within an axial bore in the shaft of said main plug, and a handle secured to the outside end of said shaft, the outer end of said shaft of said main plug having diametrically opposite notches therein, said handle being adapted to engage in said notches in two opposite positions under the action of said spring.

5. An apparatus as defined in claim 2, wherein said second valve has two coaxial cylindrical chambers, a wall separating said chambers and having a conical bore therein, one of said chambers being adapted to be connected to said plug chamber, the second chamber communicating with the outer atmosphere, a slender valve cone extending from the first chamber into the second chamber through said conical bore and adapted to close the same, and a spring within said first chamber so as normally to close said chamber relative to said second chamber, and a member within said second chamber and extending to the outside of said valve, said member being adapted to act upon said valve cone to open said valve against the action of said spring.

References Cited in the file of this patent

UNITED STATES PATENTS 1,532,705    Levin  ---------------- Apr. 7, 1925